(12) United States Patent
Yamaguchi (10) Patent No.: US 6,808,229 B2
(45) Date of Patent: Oct. 26, 2004

(54) FRONT VEHICLE FRAME STRUCTURE

(75) Inventor: Kazuyuki Yamaguchi, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 94 days.

(21) Appl. No.: 10/374,088

(22) Filed: Feb. 27, 2003

(65) Prior Publication Data

US 2003/0184124 A1 Oct. 2, 2003

(30) Foreign Application Priority Data

Apr. 2, 2002 (JP) ........................................ 2002-099501

(51) Int. Cl.⁷ .................................................. B60J 7/00
(52) U.S. Cl. ................... 296/204; 296/205; 296/203.02
(58) Field of Search ............................ 296/204, 187.03, 296/203.02, 203.01, 193.09, 205; 180/312, 291, 311; 280/781, 124.109, 785, 788, 124.01; 414/24.5

(56) References Cited

U.S. PATENT DOCUMENTS

| | | | | | |
|---|---|---|---|---|---|
| 3,806,149 A | * | 4/1974 | Huszar | ........................ | 296/204 |
| 4,163,578 A | * | 8/1979 | Watson | ........................ | 296/204 |
| 4,355,844 A | * | 10/1982 | Fantini Muzzarelli | ...... | 296/205 |
| 4,790,588 A | * | 12/1988 | Corson | ........................ | 296/204 |
| 4,810,028 A | * | 3/1989 | Henricks | ............... | 296/203.01 |
| 4,869,539 A | * | 9/1989 | Cassese | ........................ | 280/781 |
| 4,892,164 A | * | 1/1990 | Yasui et al. | .................. | 180/311 |
| 5,094,313 A | * | 3/1992 | Mauws | ........................ | 296/205 |
| 5,332,281 A | * | 7/1994 | Janotik et al. | ............... | 296/205 |
| 5,352,011 A | * | 10/1994 | Kihara et al. | ................. | 296/204 |
| 5,577,571 A | * | 11/1996 | Rizzoli | ........................ | 180/291 |
| 5,660,116 A | * | 8/1997 | Dannawi et al. | ........ | 296/187.03 |
| 5,660,428 A | * | 8/1997 | Catlin | .................... | 296/203.01 |
| 5,769,587 A | * | 6/1998 | Gilfoil et al. | ............... | 414/24.5 |
| 5,855,250 A | * | 1/1999 | Nishi | .......................... | 280/781 |
| 5,954,364 A | * | 9/1999 | Nechushtan | ........... | 296/203.01 |
| 6,092,865 A | * | 7/2000 | Jaekel et al. | ................. | 296/205 |
| 6,099,071 A | * | 8/2000 | Kasuga et al. | ............... | 296/205 |
| 6,123,378 A | * | 9/2000 | Teply et al. | ................. | 296/205 |
| 6,241,310 B1 | * | 6/2001 | Patelczyk | .................... | 296/205 |
| 6,293,617 B1 | * | 9/2001 | Sukegawa | .................... | 296/205 |
| 6,299,240 B1 | * | 10/2001 | Schroeder et al. | .......... | 296/204 |
| 6,302,478 B1 | * | 10/2001 | Jaekel et al. | ................. | 296/205 |
| 6,371,767 B1 | * | 4/2002 | Libby | .......................... | 296/205 |
| 6,416,119 B1 | * | 7/2002 | Gericke et al. | ............. | 296/205 |
| 6,533,348 B1 | * | 3/2003 | Jaekel et al. | ............... | 296/205 |
| 6,588,536 B1 | * | 7/2003 | Chiu | .......................... | 180/312 |
| 6,598,933 B2 | * | 7/2003 | Taguchi et al. | ........ | 296/203.02 |
| 2002/0093221 A1 | * | 7/2002 | Forssell et al. | ........ | 296/203.02 |
| 2003/0001377 A1 | * | 1/2003 | Ishii et al. | .................. | 280/785 |
| 2003/0107241 A1 | * | 6/2003 | Ritchie et al. | ......... | 296/203.02 |
| 2003/0141746 A1 | * | 7/2003 | Stoffels et al. | ......... | 296/203.02 |

FOREIGN PATENT DOCUMENTS

JP        2001-310756 A      11/2001

* cited by examiner

Primary Examiner—Kiran Patel
(74) Attorney, Agent, or Firm—Shinjyu Global IP Counselors, LLP.

(57) ABSTRACT

A front vehicle frame structure is configured to distribute an impact load imparted from the front of the vehicle to front side members and side frames. The front vehicle frame structure includes a pair of front side members and a pair of side frames coupled together by a center cross frame. Each of the front side members and corresponding one of the side frames are coupled together at locations that are closer to the vehicle front and that are closer to the vehicle rear than the center cross frame with respect to the front to rear direction of the vehicle.

18 Claims, 4 Drawing Sheets

FRONT VEHICLE FRAME STRUCTURE

BACKGROUND OF THE INVENTION

1. Field of the Invention

The present invention relates to a front vehicle frame structure. More specifically, the present invention relates to a front vehicle frame structure in which front side members and side frames are coupled together through a center cross frame.

2. Background Information

A front vehicle frame structure is a framework in which the engine of a vehicle is housed. An example of a front vehicle frame structure is described in Laid-Open Japanese Patent Publication No. 2001-310756. A front vehicle frame structure in this publication comprises a pair of left and right side frames, a cross member, sub frames, and brackets. The cross member has a seat for attaching an engine mount section and is arranged transverse between the left side frame and the right side frame. The sub frames are arranged respectively under the side frames and have their rear ends coupled to the corresponding side frames. The brackets couple each side frame and respective sub frame together at the respective coupling sections where the cross member and each of the side frames are coupled together.

In view of the above, it will be apparent to those skilled in the art from this disclosure that there exists a need for an improved front vehicle frame structure. This invention addresses this need in the art as well as other needs, which will become apparent to those skilled in the art from this disclosure.

SUMMARY OF THE INVENTION

It has been discovered that, with the conventional front vehicle frame structure just described, there is a possibility that an impact load will be imparted disproportionately between the side frames and the sub frames when the impact load is imparted to the vehicle from the front. Moreover, when a larger proportion of the impact load is imparted to one of the side frames or one of the sub frames, there is a risk that that particular side frame or sub frame will deform in an unexpected manner. Consequently, the side frames and/or the sub frames will not absorb the energy resulting from the impact load in an intended manner.

The present invention was conceived in view of these circumstances. One of the objects of the present invention is to provide a front vehicle frame structure that can obtain a desired deformation mode and improve the efficiency with which an impact load imparted from the front of a vehicle is absorbed.

The forgoing object can be attained by providing a front vehicle frame structure that basically comprises first and second front side members, first and second side frames, and a cross center frame. The first and second front side members are arranged to extend in a front to rear direction of a vehicle. The first and second side frames are arranged to extend in the front to rear direction of the vehicle underneath the first and second front side members, respectively. The center cross frame has a first end section coupled to the first front side member and the first side frame, and a second end section coupled to the second front side member and the second side frame. The first and second side frames are vertically aligned with the first and second front side members, respectively. The first front side member is coupled to the first side frame at positions in front of the center cross frame and behind the center cross frame relative to the front to rear direction of the vehicle. The second front side member is coupled to the second side frame at positions in front of the center cross frame and behind the center cross frame relative to the front to rear direction of the vehicle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
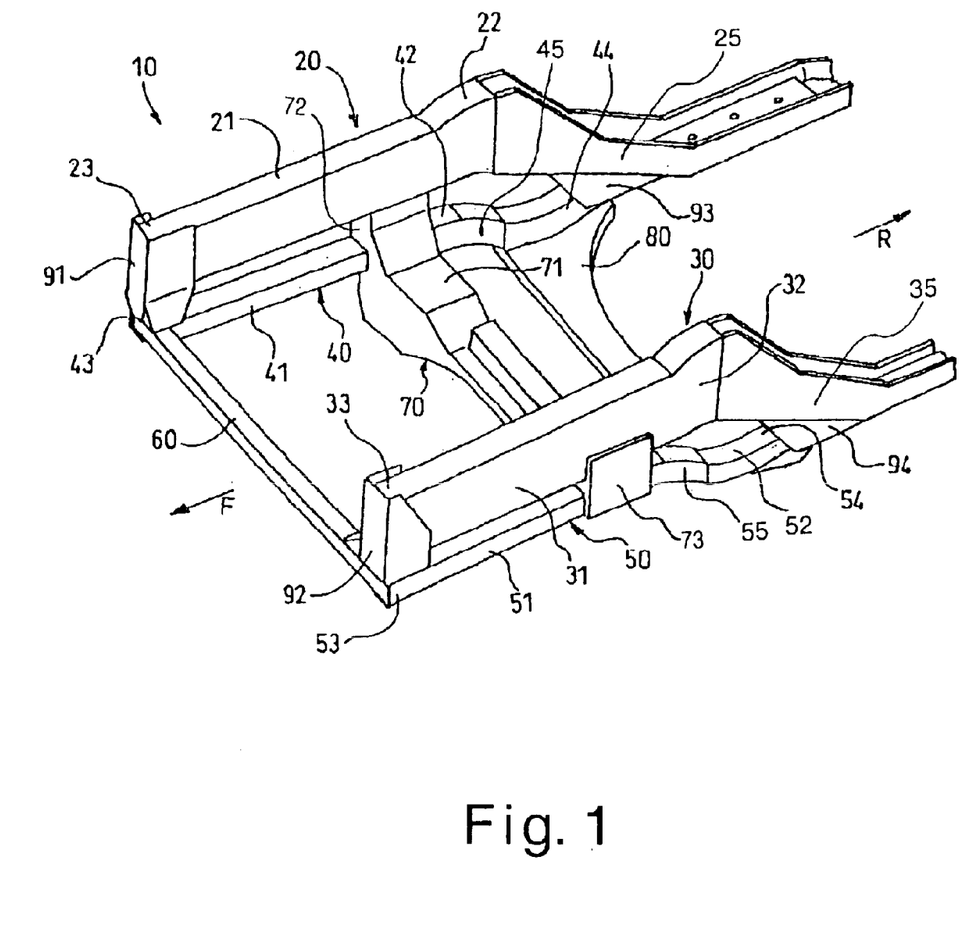
FIG. 1 is a schematic perspective view of a front vehicle frame structure in accordance with a first embodiment of the present invention.
Figure 2A:
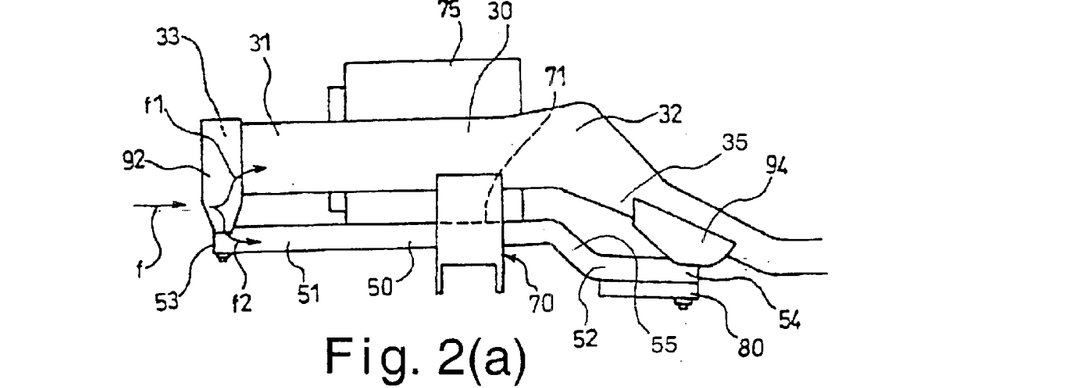
FIGS. 2(a)–2(c) are schematic left side elevational views of the front vehicle frame structure illustrated in FIG. 1 in accordance with the first embodiment of the present invention, showing the operations of the front vehicle frame structure when an impact load is imparted thereto.
Figure 2B:
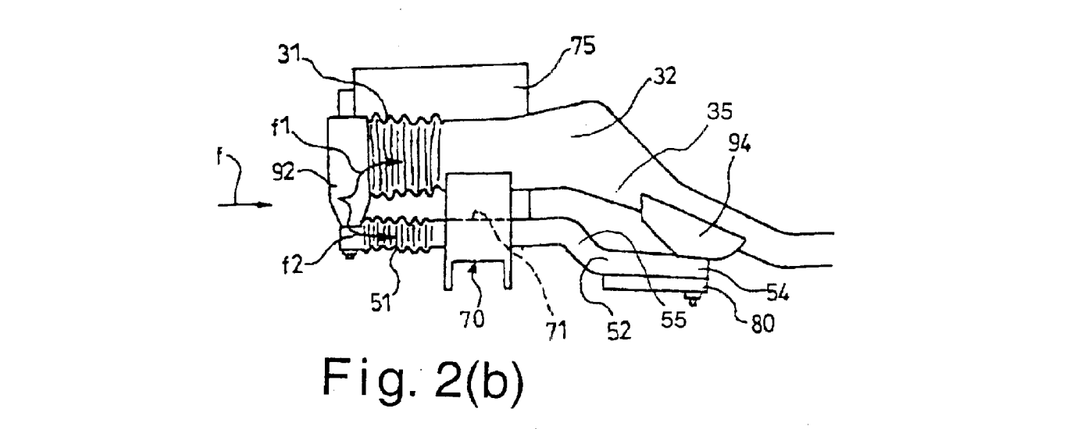
Figure 2C:
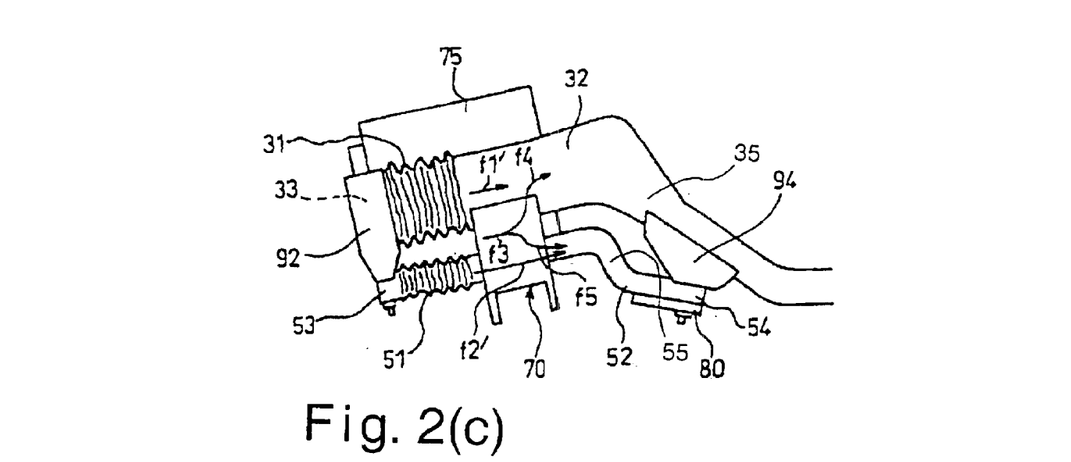
Figure 3A:
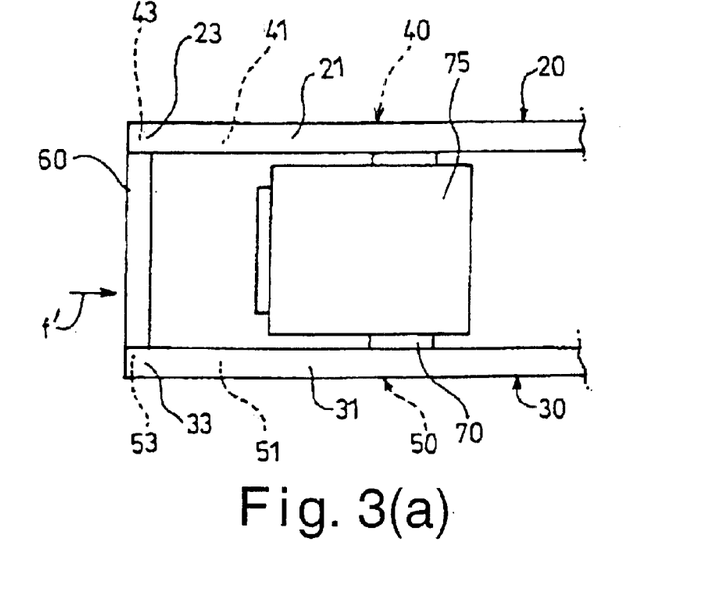
FIGS. 3(a) and 3(b) are simplified top plan views of the front vehicle frame structure illustrated in FIGS. 1 and 2(a)–2(c) in accordance with the first embodiment of the present invention, showing the operations of the front vehicle frame structure when a localized impact load is imparted thereto.
Figure 3B:
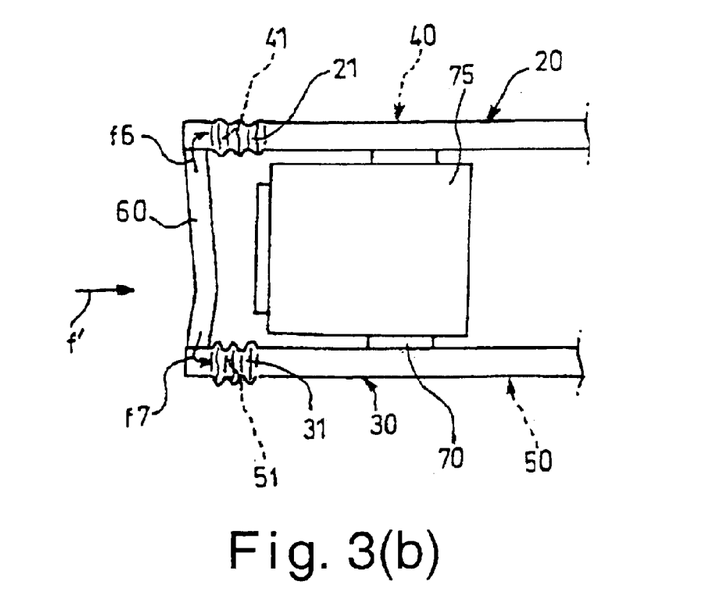

Referring initially to FIGS. 1–3, a front vehicle frame structure 10 is illustrated in accordance with the first embodiment of the present invention. A seen in FIG. 1, the front vehicle frame structure 10 basically comprises a pair of front side members 20 and 30, a pair of side frames 40 and 50, a front cross frame 60, a center cross member or a center cross frame 70, and a rear cross frame 80. A first arrow indicates a vehicle front F, while a second arrow indicates a vehicle rear R. The center cross frame 70 extends in a transverse direction of the vehicle between the side frame 40 and the side frame 50. The center cross frame 70 couples the front side member 20 with the side frame 40, and the front side member 30 with the side frame 50. Moreover, the front side members 20 and 30 are coupled to the side frames 40 and 50, respectively, by a plurality of brackets at a plurality of locations in front of the center cross frame 70 and behind the center cross frame 70 relative to the front to rear direction of the vehicle.

This arrangement of the first embodiment is directed to appropriately distribute an impact energy, which is imparted from the front of the vehicle in the front to rear direction, to the front side members 20 and 30 and the side frames 40 and 50. The impact energy is appropriately distributed to the front side members 20 and 30 and the side frames 40 and 50 thorough the coupling sections where the front side members 20 and 30 are coupled together with the side frames 40 and 50. Therefore, in the front vehicle frame structure 10 of the first embodiment, the impact energy is efficiently absorbed by the front side members 20 and 30 and the side frames 40 and 50.

The front side members 20 and 30 are elongated members that extend substantially horizontally in the front to rear direction of the vehicle. The front side member 20 basically comprises a front section 21, a rear section 22 and a front end portion 23. Likewise, the front side member 30 basically comprises a front section 31, a rear section 32 and a front end portion 33. Moreover, the front side members 20 and 30 have inclined sections 25 and 35, respectively, that are inclined downwardly with respect to the vehicle at locations behind the center cross frame 70 with respect to the front to rear direction of the vehicle. The inclined sections 25 and 35 of the front side frames 20 and 30 are configured so that longitudinal axes of the front parts of the front side members 20 and 30 (the parts in front of the inclined sections 25 and 35 with respect to the vehicle) are substantially offset from longitudinal axes of the rear parts of the front side members 20 and 30 (the parts behind the inclined sections 25 and 35 with respect to the vehicle), respectively. The front section 21 of the front side member 20 is defined as a section between the front end portion 23 and a portion where the center cross frame 70 is coupled thereto. The rear section 22 of the front side member 20 is defined as a section between the portion where the center cross frame 70 is coupled thereto and the inclined section 25. Similarly, the front section 31 of the front side member 30 is defined as a section between the front end portion 33 and a portion where the center cross frame 70 is coupled thereto. The rear section 32 of the front side member 30 is defined as a section between the portion where the center cross frame 70 is coupled thereto and the inclined section 35.

The side frames 40 and 50 are elongated members that extend substantially horizontally in the front to rear direction of the vehicle. The side frames 40 and 50 are disposed directly underneath the front side members 20 and 30, respectively so that the side frames 40 and 50 are vertically aligned with the front side members 20 and 30, respectively. Moreover, the side frames 40 and 50 are arranged to be substantially parallel with the front side members 20 and 30, respectively. The side frame 40 comprises a front frame section 41, a rear frame section 42, a front end portion 43 and a rear end portion 44. Likewise, the side frame 50 comprises a front frame section 51, a rear frame section 52, a front end portion 53 and a rear end portion 54. Moreover, the side frames 40 and 50 have inclined sections 45 and 55, respectively, that are inclined downwardly with respect to the vehicle at locations behind the center cross frame 70 with respect to the front to rear direction of the vehicle. The inclined sections 45 and 55 of the side frames 40 and 50 are configured so that longitudinal axes of the front parts of the side frames 40 and 50 (the parts in front of the inclined sections 45 and 55 with respect to the vehicle) are substantially offset from longitudinal axes of the rear parts of the side frames 40 and 50 (the parts behind the inclined sections 45 and 55 with respect to the vehicle), respectively. The amount by which the rear portions of the side frames 40 and 50 are offset from the front portions of the side frames 40 and 50, respectively, is smaller than the amount by which the rear portions of the front side members 20 and 30 are offset from the front portions of the front side members 20 and 30, respectively. The front frame section 41 is defined as a section between the front end portion 43 and a portion where the center cross member 70 is coupled thereto. The rear frame section 42 is defined as a section between the portion where the center cross member 70 is coupled thereto and the rear end portion 44. Similarly, the front frame section 51 is defined as a section between the front end portion 53 and a portion where the center cross member 70 is coupled thereto. The rear frame section 52 is defined as a section between the portion where the center cross member 70 is coupled thereto and the rear end portion 54.

In this first embodiment, each of the side frames 40 and 50 is preferably arranged to be a single, unitary one-piece member. Of course, it will be apparent to those skilled in the art from this disclosure that the side frame 40 can be arranged so that the front frame section 41 and the rear frame section 42 are separate members that are coupled together by the center cross frame 70. Likewise, the side frame 50 can be arranged so that the front frame section 51 and the rear frame section 52 are separate members that are coupled together by the center cross frame 70.

Moreover, the front side member 20 and the side frame 40 can be considered a first front side member and a first side frame member, respectively. Also, the front side member 30 and the side frame 50 can be considered a second front side member and a second side frame member, respectively. Of course, it will be apparent to those skilled in the art from this disclosure that the front side member 20 and the side frame 40 can be considered a second front side member and a second side frame member, respectively. Likewise, the front side member 30 and the side frame 50 can be considered a first front side member and a first side frame member, respectively.

The front side member 20 and the side frame 40 are coupled together by a front mount bracket 91 at a location that is closer to the vehicle front F than the center cross frame 70 with respect to the vehicle. More specifically, the front mount bracket 91 couples the front end portion 23 of the front side member 20 and the front end portion 43 of the side frame 40. Similarly, the front side member 30 and the side frame 50 are coupled together by a front mount bracket 92 at a location that is closer to the vehicle front F than center cross frame 70 with respect to the vehicle. More specifically, the front mount bracket 92 couples the front end portion 33 of the front side member 30 and the front end portion 53 of the side frame 50.

The front side member 20 and the side frame 40 are also coupled together by a rear mount bracket 93 at a location that is closer to the vehicle rear R than the center cross frame 70 with respect to the vehicle. More specifically, the rear mount bracket 93 couples the rear end portion 44 of the side frame 40 with the inclined section 25 of the front side member 20. Similarly, the front side member 30 and the side frame 50 are coupled together by a rear mount bracket 94 at a location that is closer to the vehicle rear R than the center cross frame 70 with respect to the vehicle. More specifically, the rear mount bracket 94 couples the rear end portion 54 of the side frame 50 with the inclined section 35 of the front side member 30.

As shown in FIG. 1, the front cross frame 60, the center cross frame 70 and the rear cross frame 80 are elongated members that are arranged in a substantially horizontal manner in the transverse direction of the vehicle. The front cross frame 60 is coupled between the side frames 40 and 50 at a position that is closer to the vehicle front F than the center cross frame 70 with respect to the vehicle. The rear cross frame 80 is coupled between the side frames 40 and 50 at a position that is closer to the vehicle rear R than the center cross frame 70 with respect to the vehicle. The center cross frame 70 is located between the front cross frame 60 and the rear cross frame 80 with respect to the front to rear direction of the vehicle.

More specifically, one lateral end of the front cross frame 60 is coupled to the side frame 40 at the front end portion 43 of the second side frame 40. Also, the other lateral end of the front cross frame 60 is coupled to the side frame 50 at the front end portion 53 of the side frame 50. Moreover, the front cross frame 60 is arranged in such a manner that a front edge of the front cross frame 60 is substantially aligned with the front edges of the front end portions 23 and 33 of the front side members 20 and 30, respectively, with respect to the front to rear direction of the vehicle.

The center cross frame 70 includes a pair of end sections 72 and 73 as shown in FIG. 1. The end section 72 is fixedly coupled to the front side member 20 and the side frame 40 on the right-hand side of the vehicle. The end section 73 is fixedly coupled to the front side member 30 and the side frame 50 on the left-hand side of the vehicle. Either the end sections 72 or 73 can be considered to be a first end section that is coupled to the first front side member and the first side frame, and the other can be considered to be a second end section that is coupled to the second front side member and the second side frame.

The center cross frame 70 preferably includes at least one engine mount section 71 for mounting an engine 75 of the vehicle, as seen in FIG. 1. The engine mount section 71 is preferably formed on a portion of the center cross frame 70 that is closer to the right side of the vehicle. Moreover, as best seen in FIG. 2(a), the engine mount section 71 is preferably arranged such that an upper surface of the engine mount section 71 has substantially the same height as heights of the upper surfaces of the side frames 40 and 50 as measured from the ground level when the vehicle has been fully assembled. Of course, it will be apparent to those skilled in the art from this disclosure that the position and/or the orientation of the engine mount section 71 can be varied depending on designs and other considerations in manufacturing various types of vehicles. In addition, when the center cross frame 70 has a pair of engine mount sections, the engine mount sections are preferably arranged such that the upper surfaces of the engine mount sections are substantially aligned in the horizontal direction with the upper surfaces of the side frames 40 and 50.

The rear cross frame 80 is coupled to the rear portions of the side frames 40 and 50, respectively.

Accordingly, in the front vehicle frame structure 10 in accordance with the first embodiment of the present invention, the front side member 20 and the side frame 40 are coupled together at three locations by the front mount bracket 91, the center cross frame 70, and the rear mount bracket 93. Likewise, the front side member 30 and the side frame 50 are also coupled together at three locations by the front mount bracket 92, the center cross frame 70, and the rear mount bracket 94. Moreover, the front side members 20 and 30 and the side frames 40 and 50 are all coupled together by the center cross frame 70. Consequently, the front side members 20 and 30 and the side frames 40 and 50 are coupled together at six locations. Therefore, in this first embodiment of the present invention, the number of locations where the front side members 20 and 30 and the side frames 40 and 50 are coupled together is larger than in conventional front vehicle frame structures. Accordingly, the rigidity of the front vehicle frame structure 10 of the present invention is higher than the rigidity of conventional front vehicle frame structures.

Referring now to FIGS. 2(a)–2(c), the operation that takes place when an impact load is imparted to the front vehicle frame structure 10 from the front of the vehicle will be explained. FIGS. 2(a)–2(c) show elevational views of the front vehicle frame structure 10 as seen from the left side of the vehicle. Although only the front side member 30, the side frame 50, the front mount bracket 92 and the rear mount bracket 94 are shown in FIGS. 2(a)–2(c), the same manner of operation is performed by the front side member 20, the side frame 40, the front mount bracket 91 and the rear mount bracket 93 that are disposed on the right side of the vehicle. Thus, explanation of the operation of the right side parts is omitted for the sake of brevity.

As shown in FIG. 2(a), when an impact load f is imparted to the front vehicle frame structure 10 from the front of the vehicle in the front to rear direction, the impact load f is distributed appropriately to the front side member 30 and the side frame 50 from the beginning of the impact impartation. More specifically, the load f is distributed into load f1 that is imparted to the front section 31 of the front side member 30 and load f2 that is imparted to the front frame section 51 of the side frame 50. This dispersion of the impact load f is accomplished because the front side member 30 and the side frame 50 are coupled together by the front mount bracket 92 at a position that is closer to the front of the vehicle than the center cross frame 70. More specifically, the front end portion 33 of the front side member 30 is coupled together with the front end portion 53 of the side frame 50 by the front mount bracket 92. Accordingly, the impact load f imparted to the front of the vehicle is distributed appropriately as the load f1 to the front section 31 of the front side member 30 and as the load f2 to the front frame section 51 of the side frame 50.

Since only a portion, the load f1, of the impart load f is imparted to the front section 31 of the front side member 30 and only a portion, the load f2, of the impart load f is imparted to the front frame section 51 of the side frame 50, disproportionate impartation of the impact load f between the front section 31 and the front frame section 51 can be prevented. In other words, the impact load f is prevented from imparting either only to the front section 31 of the front side member 30 or only to the front frame section 51 of the side frame 50. Consequently, the front section 31 of the front side member 30 and the front frame section 51 of the side frame 50 can be prevented from deforming in an unexpected manner due to the input of a larger proportion of the impact load f than expected. Instead, both of the front section 31 of the front side member 30 and the front frame section 51 of the side frame 50 will be deformed in an appropriate manner, i.e., the manner intended beforehand, upon the impartation of the load f1 and the load f2, respectively.

The load f1 imparted to the front side member 30 acts in the front to rear direction of the front section 31 of the front side member 30 as shown in FIG. 2(b). As a result, the front section 31 of the front side member 30 undergoes axial deformation wherein it collapses in a bellows-like manner in the front to rear direction. Accordingly, the energy imparted by the load f1 is absorbed by this axial deformation of the front section 31.

The load f2 imparted to the front frame section 51 acts in the front to rear direction of the side frame 50 as shown in FIG. 2(b). As a result, the front frame section 51 undergoes axial deformation wherein it collapses in a bellows-like manner in the front to rear direction. Accordingly, the energy imparted by the load f2 is absorbed by this axial deformation of the front frame section 51.

In this first embodiment, the front section 31 of the front side member 30 and the front frame section 51 of the side frame 50 are deformed by axial deformation in which they collapse in a bellows-like manner. Of course, it will be apparent to those skilled in the art from this disclosure that instead of axial deformation, the front section 31 of the front side member 30 and the front frame section 51 of the side frame 50 can be configured and/or arranged to undergo bending deformation. In the case of bending deformation too, the energy imparted as the load f1 and the load f2 can be absorbed by the deformations of the front section 31 and the front frame section 51 efficiently.

Furthermore, as seen in FIG. 2(c), the impact load f can be appropriately distributed to the rear section 32 and the rear frame section 52 when the energy of the impact load f cannot be fully absorbed by the front section 31 and the front frame section 51 alone. This dispersion of the impact load f is accomplished because the front side member 30 and the side frame 50 are coupled together by the center cross frame 70, and also because the inclined section 35 of the front side member 30 and the rear end portion 54 of the side frame 50 are coupled together by the rear mount bracket 94.

When the energy of the impact load f is so large that it cannot be fully absorbed by the front section 31 and the front frame section 51 alone, the front section 31 and the front frame section 51 deform until the front end portion 33 of the front side member 30 and the front end portion 53 of the side frame 50 reach a front end of the engine 75 which is mounted on the engine mount section 71 of the center cross frame 70. When the front end portion 33 and the front end portion 53 reach the engine 75, the impact load f is also distributed to the engine 75. More specifically, the impact load f is divided into load f1' imparted to the front section 31, load f2' imparted to the front frame section 51, and load f3 imparted to the engine 75, as shown in FIG. 2(c).

The load f3 distributed to the engine 75 is imparted from the engine 75 to the center cross frame 70 through the engine mount section 71. As described above, the center cross frame 70 fixedly couples the front side member 30 to the side frame 50. Therefore, the load f3 transmitted to the center cross frame 70 is divided into load f4 that is imparted to the rear section 32 of the front side member 30 and load f5 that is imparted to the rear frame section 52 of the side frame 50. Accordingly, the rear section 32 of the front side member 30 bears both the load f1' imparted from the front section 31 and the load f4 imparted from the center cross frame 70. Likewise, the rear frame section 52 bears both the load f2' imparted from the front frame section 51 and the load f5 imparted from the center cross frame 70. As a result, the rear section 32 of the front side member 30 deforms so as to absorb the sum of the load f1' and the load f4, i.e., load (f1'+f4). The rear frame section 52 deforms so as to absorb the sum of the load f2' and the load f5, i.e., load (f2'+f5).

In this first embodiment, only a portion of the impart load f, the load (f1'+f4), is imparted to the rear section 32 of the front side member 30 and only a portion of the impart load f, the load (f2'+f5), is imparted to the rear frame section 52 of the side frame 50. Therefore, disproportionate impartation of the impact load f in which the impact load f is born by either the rear section 32 or the rear frame section 52 alone can be prevented. Accordingly, the rear section 32 and the rear frame section 52 will not deform in an unexpected manner due to the input of the impact load f. Instead, the rear section 32 of the front side member 30 and the rear frame section 52 of the side frame 50 will deform in an appropriate manner, i.e., the manner intended beforehand upon the impartation of the load (f1'+f4) and the load (f2'+f5), respectively.

Since the rear section 32 of the front side member 30 has the inclined section 35 that is inclined downwardly, the deformation that the rear section 32 undergoes due to the load (f1'+f4) is bending deformation, as best seen in FIG. 2(c). Likewise, since the rear frame section 52 of the side frame 50 has the inclined section 55 that is inclined downwardly, the deformation that the rear frame section 52 undergoes due to the load (f2'+f5) is also bending deformation.

Moreover, when the engine 75 moves rearward due to the load f3 imparted to the engine 75, a rotational moment can be caused. This rotational moment acts on a portion where the end section 73 of the center cross frame 70 and the side frame 50 are coupled together. Accordingly, the rotational moment often causes an unforeseen deformation of the side frame 50. In this first embodiment, the height of the upper surface of the front frame section 51 and the upper surface of a part of the rear frame section 52 that is closer to the front of the vehicle are aligned with the height of the upper surface of the engine mount section 71 as measured from the ground level. Accordingly, the rotational moment caused by movement of the engine 75 can be prevented from acting on the portion where the side frame 50 is coupled to the center cross frame 70 in the case where the engine 75 moves rearward due to the load f3 imparted to the engine 75. Thus, the unforeseen deformation of the side frame 50 can be avoided.

Next, referring to FIGS. 3(a) and 3(b), the operation that takes place when a localized impact is imparted to a part of the front of the vehicle will be explained.

When impact energy is input at a part of the vehicle front F with respect to the transverse direction of the vehicle, such a localized impact load f' is first imparted to the front cross frame 60. As described above, the front cross frame 60 is coupled between the side frames 40 and 50 in the transverse direction of the vehicle such that the side frames 40 and 50 are coupled together at the front end portions 43 and 53, respectively. Accordingly, when the localized impact load f' is imparted to the front cross frame 60, the localized impact load f' is distributed into load f6 imparted to the front frame section 41, and load f7 imparted to the front frame section 51, as shown in FIG. 3(b). In other words, only a portion of the localized impact load f', the load f6, is imparted to the front frame section 41 and only a portion of the localized impact load f', the load f7, is imparted to the front frame section 51. Thus, the disproportionate impartation in which the localized impact load f' is born by either the front frame section 41 or the front frame section 51 alone can be prevented. Accordingly, the front frame sections 41 and 51 can be prevented from deforming in an unforeseen manner due to the input of the localized impact load f'. Instead, the front frame sections 41 and 51 will be deformed in an appropriate manner, i.e., the manner intended beforehand upon the impartation of the load f6 and the loads, respectively.

Furthermore, in this first embodiment, the front edge of the front cross frame 60 is substantially aligned with front edges of the front end portions 23 and 33 of the front side members 20 and 30, respectively, with respect to the front to rear direction of the vehicle. Moreover, the front frame sections 41 and 51 of the side frames 40 and 50, respectively, are coupled to the front end portions 23 and 33 of the front side members 20 and 30 by the front mount brackets 91 and 92, respectively. Thus, the load f6 is distributed not only to the front frame section 41 of the side frame 40 but also to the front section 21 of the front side member 20. Likewise, the load f7 is distributed not only to the front frame section 51 of the side frame 50 but also to the front section 31 of the front side member 30. Accordingly, the localized impact load f' that was imparted in a part of the vehicle front can be distributed appropriately between the front side members 20 and 30, and the side frames 40 and 50 in the same manner as described previously by using FIGS. 2(a)–(c).

In this first embodiment, the front frame sections 41 and 51 of the side frames 40 and 50 are coupled to the front side members 20 and 30 at the front end portions 43 and 53. Of course, it will be apparent to those skilled in the art from this disclosure that the front side frames 40 and 50 can be arranged to be coupled to the front side members 20 and 30, respectively, at locations other than the front end portions 23 and 43, and 33 and 53, respectively, so long as they are coupled at locations that are closer to the vehicle front F than the center cross frame 70 with respect to the vehicle. When the side frames 40 and 50 are coupled to the front side members 20 and 30, respectively, at locations other than the front end portions 23 and 43, and 33 and 53, respectively, that are closer to the vehicle front F than center cross frame 70, the impact load f delivered to the vehicle front F is initially imparted to either the front side members 20 and 30 or the side frames 40 and 50 alone. Then, similarly to the previously described in the first embodiment, loads f6 and f7 are distributed appropriately to the front side members 20 and 30 and the side frames 40 and 50 at the locations where the side frames 40 and 50 are coupled together with the front side members 20 and 30, respectively.

Second Embodiment

Figure 4:
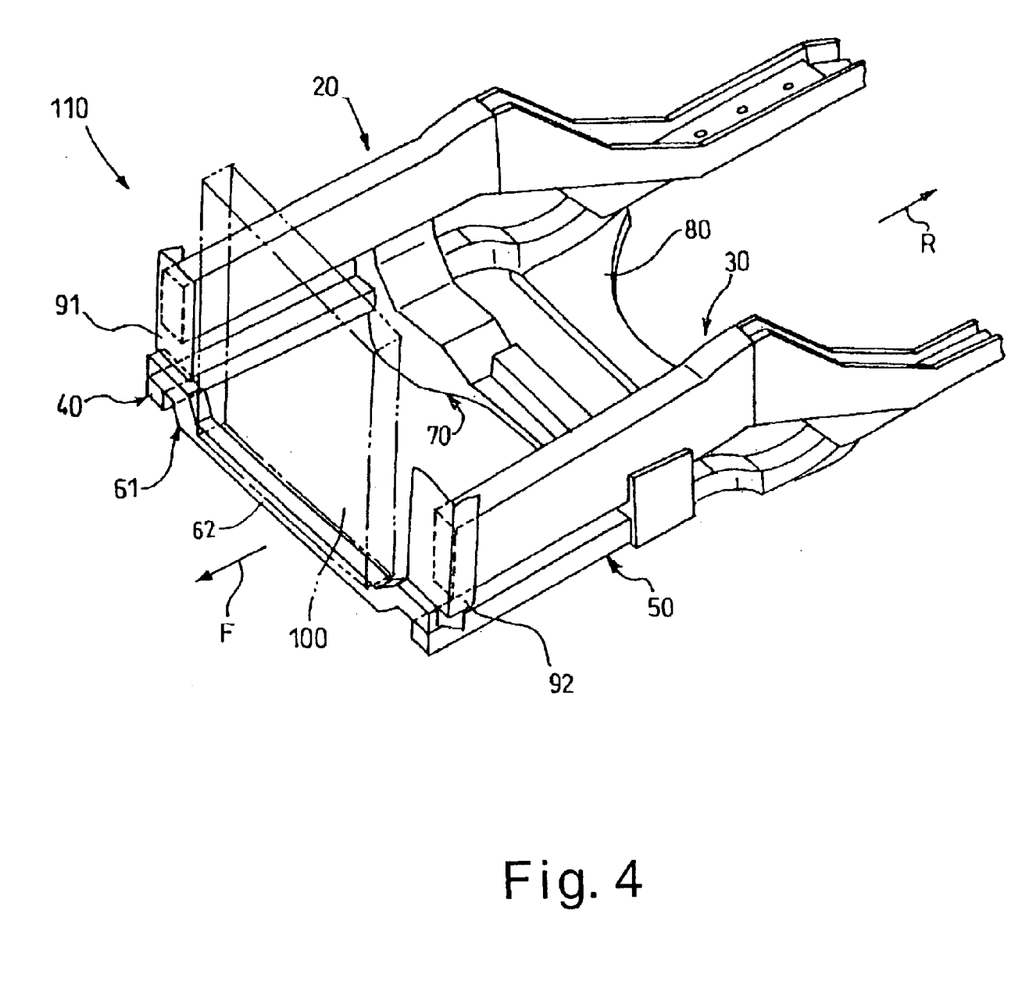
FIG. 4 is a schematic perspective view of a front vehicle frame structure in accordance with a second embodiment of the present invention.

Referring now to FIG. 4, a front vehicle frame structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, this second embodiment is identical in construction and function as the first embodiment, except that the front cross frame 60 in the first embodiment is replaced with a front cross frame 61. The front cross frame 61 includes a radiator core support section 62 that supports a radiator core 100 from underneath. Thus, the front cross frame 61 also serves as a radiator core support member. Moreover, the front cross frame 61 is configured and arranged to have the same function and effects as the front cross frame 60 as explained in the first embodiment.

Accordingly, with the front vehicle frame structure 110 of the second embodiment, it is not necessary to provide a separate radiator core support member. Thus, the front vehicle frame structure 110 of the second embodiment demonstrates the useful effects of enabling the cost of manufacture to be reduced by reducing the number of component parts. Moreover, this second embodiment of the present invention enables the vehicle weight to be reduced by reducing the number of component parts.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-099501. The entire disclosure of Japanese Patent Application No. 2002-099501 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A front vehicle frame structure comprising:

first and second front side members arranged to extend in a front to rear direction of a vehicle, each of the first and second front side members being a continuous structure including a front end portion and a rear end section;

first and second side frame members arranged to extend in the front to rear direction of the vehicle underneath and substantially parallel to the first and second front side members, respectively, each of the first and second side frame members being a continuous structure including a front end portion and a rear end portion;

a center cross member having a first end section coupled to the first front side member at a position between the front end portion and the rear end section of the first front side member and coupled to the first side frame member at a position between the front end portion and the rear end portion of the first side frame member, the center cross member having a second end section coupled to the second front side member at a position between the front end portion and the rear end section of the second front side member and coupled to the second side frame member at a position between the front end portion and a rear end portion of the second side frame member, the first and second side frame members being vertically aligned with the first and second front side members, respectively, the front end portion of the first front side member being coupled to the front end portion of the first side frame member at a position in front of the center cross member relative to the front to rear direction of the vehicle, and the rear section of the first front side member being coupled to the rear portion of the first side frame member at a position behind the center cross member relative to the front to rear direction of the vehicle, the front end portion of the second front side member being coupled to the front end portion of the second side frame member at a position in front of the center cross member relative to the front to rear direction of the vehicle, and the rear section of the second front side member being coupled to the rear portion of the second side frame member at a position behind the center cross member relative to the front to rear direction of the vehicle, and the first and second front side members, the first and second side frame members and the center member of the front vehicle frame structure being configured and arranged to define an unobstructed engine receiving space between the first and second front side members and the first and second side frame members and above the center cross member.

2. The front vehicle frame structure recited in claim 1, wherein
the first front side member is coupled to the first side frame member at front end section and rear end section of the first side frame, and the second front side member is coupled to the second side frame member at front end section and rear end section of the second side frame.

3. The front vehicle frame structure as recited in claim 2, further comprising
a front cross frame having a first end section coupled to the front end section of the first side frame member and a second end section coupled to the front end section of the second side frame member.

4. The front vehicle frame structure as recited in claim 3, wherein
the front cross frame and the first and second side frame members are arranged such that a front end of the front cross frame relative to the front to rear direction of the vehicle is substantially aligned with front ends of the first and second front side members relative to the front to rear direction of the vehicle.

5. The front vehicle frame structure as recited in claim 4, wherein
the center cross member includes an engine mount section.

6. The front vehicle frame structure as recited in claim 5, wherein
the first and second side frame members have upper surfaces that are substantally aligned in a horizontal direction with an upper surface of the engine mount section.

7. The front vehicle frame structure as recited in claim 6, wherein
the front cross frame includes a radiator core support section located between the front end sections of the first and second side frame members.

8. The front vehicle frame structure as recited in claim 1, wherein
each of the first and second front side members includes an inclined section being inclined downwardly at a location behind the center cross member relative to the vehicle, and being coupled to die first and second side frame members, respectively.

9. The front vehicle frame structure as recited in claim 8, wherein
each of the first and second side frame members includes an inclined section being inclined downwardly at a location behind the center cross member relative to the vehicle, and being coupled to the first and second front side members, respectively, at locations behind the inclined sections of the first and second side frame members relative to the vehicle.

10. The front vehicle frame structure as recited in claim 4, wherein
the front cross frame includes a radiator core support section located between the front end sections of the first and second side frame members.

11. The front vehicle frame structure recited in claim 1, wherein
the center cross member includes an engine mount section.

12. The front vehicle frame structure recited in claim 11, wherein
the first and second side frame members have upper surfaces that are substantally aligned in a horizontal direction with an upper surface of the engine mount section.

13. The from vehicle frame structure as recited in claim 1, further comprising
a front cross frame having a first end section coupled to the front end section of the first side frame member and a second end section coupled to the front end section of the second side frame member.

14. The front vehicle frame structure as recited in claim 13, wherein
the front cross frame and the first and second side frame members are arranged such that a front end of the front cross frame relative to the front to rear direction of the vehicle is substantially aligned with front ends of the first and second front side members relative to the from to rear direction of the vehicle.

15. The front vehicle frame structure as recited in claim 14, wherein
the front cross frame includes a radiator core support section located between the first and second side frame members.

16. The front vehicle frame structure as recited in claim 15, wherein
the center cross member includes an engine mount section.

17. The front vehicle frame structure as recited in claim 16, wherein
the first and second side frame members have upper surfaces that are substantially aligned in a horizontal direction with an upper surface of the engine mount section.

18. A front vehicle frame structure, comprising:
first side supporting means for supporting a structure of a front vehicle and for absorbing a part of an impact energy input from a front side of the vehicle by deforming, the first side supporting means being arranged as a pair of continuous structures that extend in a front to rear direction of the vehicle with each of the continuous structures of the first side supporting means including an front end portion and a rear end section;
second side supporting means for supporting the structure of the front vehicle and for absorbing a part of the impact energy input from the front side of the vehicle by deforming, the second side supporting means being arranged as a pair of continuous structures that extend in the front to rear direction of the vehicle directly underneath and substantially parallel to the first side supporting means with each of the continuous structures of the second side supporting means including a front end portion and a rear end portion; and
connecting means for interconnecting the first side supporting means and the second side supporting means in both a transverse direction and a vertical direction of the vehicle such that the impact energy is distributed into the first supporting means and the second supporting means during deformation,
the first side supporting means, the second side supporting means and the connecting means being configured and arranged to define an unobstructed engine receiving space between the first side supporting means, the second side supporting means and the connecting means.

* * * * *